W. H. ALLEN.
Grain-Meter.
No. 222,851. Patented Dec. 23, 1879.
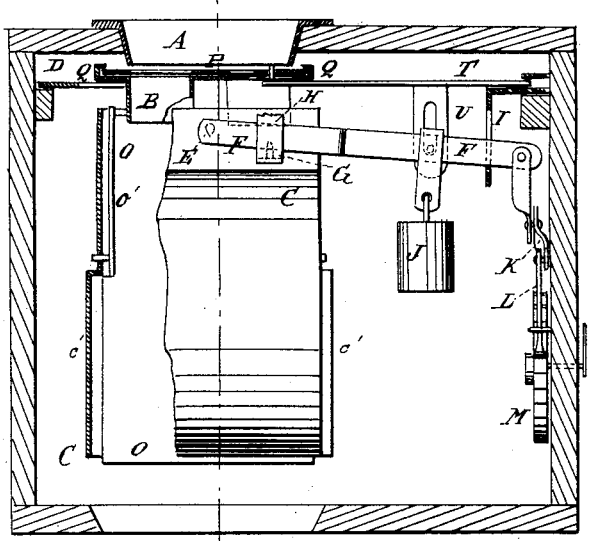
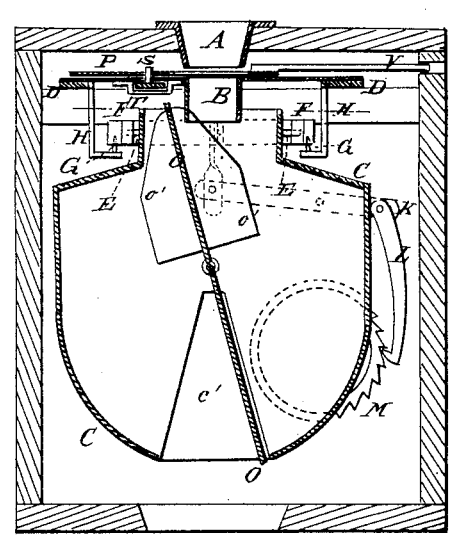
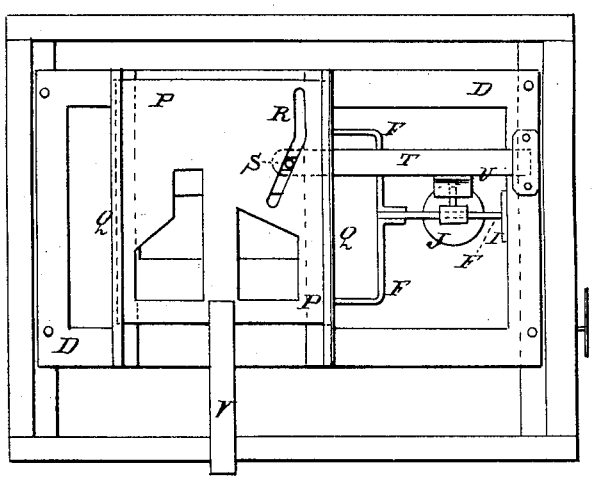
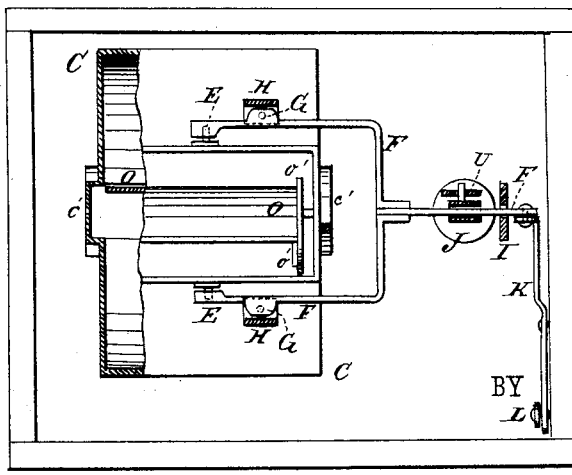
WITNESSES:
Chas. Nida.
C. Sedgwick
INVENTOR:
W. H. Allen
BY Munn & Co.
ATTORNEYS.

UNITED STATES PATENT OFFICE

WILLIAM H. ALLEN, OF NEW YORK, N. Y.

IMPROVEMENT IN GRAIN-METERS.

Specification forming part of Letters Patent No. 222,851, dated December 23, 1879; application filed July 7, 1879.

*To all whom it may concern:*

Be it known that I, WILLIAM HENRY ALLEN, of the city, county, and State of New York, have invented a new and useful Improvement in Automatic Grain Weighers and Registers, of which the following is a specification.

Figure 1 is a side view, partly in section, of my improved machine. Fig. 2 is a vertical cross-section of the same, taken through the line $x\ x$, Fig. 1. Fig. 3 is a top view of the same, the cover being removed. Fig. 4 is a top view of the same, the cover and the sliding plate and bar and their supporting-frame being removed.

Similar letters of reference indicate corresponding parts.

The object of this invention is to furnish an apparatus for weighing grain, flour, and other similar substances as they flow from a spout into a hopper or other receiver, which shall be so constructed as to deliver the substance in exact and uniform quantities, and at the same time accurately register the quantities delivered.

The invention consists in the combination of the wings or flanges with the side edges of the narrower upper part of the oscillating partition and with the vessel and the inlet-spout; in the combination of the caps with the slotted ends of the vessel and the side edges of the wider lower part of the oscillating partition; and in the combination of the adjustable sliding plate provided with the tapered holes and the inclined or curved slot, and the sliding bar with the frame, the two spouts, the vessel, the oscillating partition, and the adjustable weight suspended from the balancing-lever, as hereinafter fully described.

A represents the spout, leading from a bin, elevator, or other place, and through which the grain or other substance passes into and through the spout B into the vessel C. The spout B is attached to a frame, D, or other support, so that its lower end may always be in exactly the same position.

The vessel C is made of such a size as to easily contain more than twice the quantity to be weighed at a time. The vessel C is made with a hopper-shaped or concaved bottom, having a large opening in its lower part.

The vessel is divided into two compartments by a partition, O, which is pivoted, at or a little above the middle parts of its edges, to the middle parts of the ends of the vessel C. The partition O is made of such a length that its lower edge may project through the opening in the bottom of the vessel C, and that its upper edge may overlap the side of the lower end of the spout B when the said vessel C is raised, and may swing beneath the said lower end of the said spout B when the said vessel C is lowered. The upper half of the partition O is made a little narrower than the length of the vessel C, so as to leave narrow spaces between its side edges and the ends of the said vessel C. To the side edges of the upper part of the partition O are attached wings or flanges $o'$, as shown in Fig. 2, to serve as guards to prevent anything from getting in between the said edges and the ends of the vessel C to interfere with or prevent the easy movement of the said partition. The lower half of the partition O is made a little wider than the length of the vessel C, so as to project into wedge-shaped slots in the lower parts of the ends of the vessel C, the edges of the said slots serving as stops for the said partition, as shown in Figs. 1 and 2. The wedge-shaped slots in the ends of the vessel C are covered with caps $c'$, to prevent any grain from escaping through them while being discharged from the said vessel C. To the sides of the vessel C are attached pivots E, which are pivoted to the ends of the branches or arms of the forked lever F.

The branches of the lever F are pivoted upon fulcrums G, attached to posts or to hangers H, attached to the frame D, or to other suitable supports. The other end of the lever F projects through a slotted guide, I, attached to the frame D or other suitable support, so that the said lever F may be kept from having any lateral movement.

The lever F is provided with an adjustable weight, J, for regulating the amount of the substance to be received each time, and which is suspended from the said lever F by a slide or loop.

The fulcrums and pivots of the lever F should be knife edges or points, to make the apparatus very sensitive and to give great accuracy in the results.

The end of the lever F, or an arm connected with the said end, is connected with a lever, K, which is pivoted to the frame-work or case of the apparatus, or to some other suitable support.

To the end of the lever K is pivoted the end of a pawl, L, which engages with the teeth of a ratchet-wheel, M. The ratchet-wheel M is pivoted to the frame or case of the apparatus, or to some other suitable support, and with its pivot is connected an ordinary register for recording the quantities measured or weighed by the apparatus.

The ratchet-wheel M should be provided with a stop-pawl to prevent it from being turned back by the friction of the pawl L when being moved back for another stroke.

P is a plate interposed between the spouts A B, and sliding in ways Q, attached to the frame D. The plate P has holes formed through it corresponding in size with the cavities of the spouts A B. The holes through the plate P are extended upon the rear side, and become gradually smaller, so that the quantity of grain passing into the apparatus may be regulated as may be desired.

In the rear part of the plate P is formed an inclined or curved slot, R, to receive a pin, S, attached to the bar T, which slides upon the frame D, and has a downwardly-projecting arm, U, attached to it. The arm U is slotted to receive a pin attached to the slide or loop of the weight J.

The plate P is provided with a projecting arm, V, for convenience in adjusting it.

With this construction, as the plate P is drawn forward to lessen the quantity of grain passing into the vessel C, the weight J is drawn inward slightly in exactly the same proportion. As the grain in the vessel C overbalances the weight J and moves down, allowing the partition O to tilt, a small quantity of grain will always pass into the said vessel C before the said partition O can oscillate, and this small quantity of grain is always larger as the grain is running in more rapidly. The automatic adjustment of the weight J exactly balances this variation by being moved in slightly as a less quantity of grain is allowed to run in, so that the vessel C will stand a trifle longer before tilting when the grain is running in slowly, so that uniform quantities will always be measured, whether the grain be admitted faster or slower.

In weighing flour and other substances that do not readily pass through an opening, the inclined or concaved sides of the vessel C may also be pivoted to the ends of the said vessel, and may be connected with the oscillating partition O by rods or other suitable means, so as to be opened and closed by the movements of the said partition to enlarge the discharge-opening and allow the substance to escape freely and quickly.

In using the apparatus the substance is admitted into the closed compartment of the vessel C. As soon as the desired quantity has been received its weight overbalances the balancing-weight J, and causes the vessel C to descend, which downward movement releases the upper end of the partition O, and the weight of the substance resting against the side of its lower end instantly reverses it and allows the substance to drop out. The sudden decrease of weight thus caused allows the vessel C to rise, with the upper end of the partition O upon the other side of the spout B.

These various movements of the apparatus occur almost simultaneously.

If desired, a cross-bar or bridge may be attached to the lower end of the spout B, and a small roller pivoted to the upper edge of the partition O, to roll along the said bridge, and thus guard against the possibility of a kernel of grain catching between the edge of the spout B and the edge of the partition O, and thus impeding the movement of the said partition.

Having thus described my invention, I claim as new and desire to secure by Letters Patent—

1. The combination of the wings or flanges $o'$ with the side edges of the narrower upper part of the oscillating partition O, and with the vessel C and the spout B, substantially as herein shown and described.

2. The combination of the caps $c'$ with the slotted ends of the vessel C and the side edges of the wider lower part of the oscillating partition O, substantially as herein shown and described.

3. The combination of the adjustable sliding plate P, provided with the tapered holes and the inclined or curved slot, and the sliding bar T, with the frame D, the spouts B A, the vessel C, the oscillating partition O, and the adjustable weight J, suspended from the lever F, substantially as herein shown and described.

WILLIAM H. ALLEN.

Witnesses:
JAMES T. GRAHAM,
C. SEDGWICK.